Patented Nov. 11, 1952

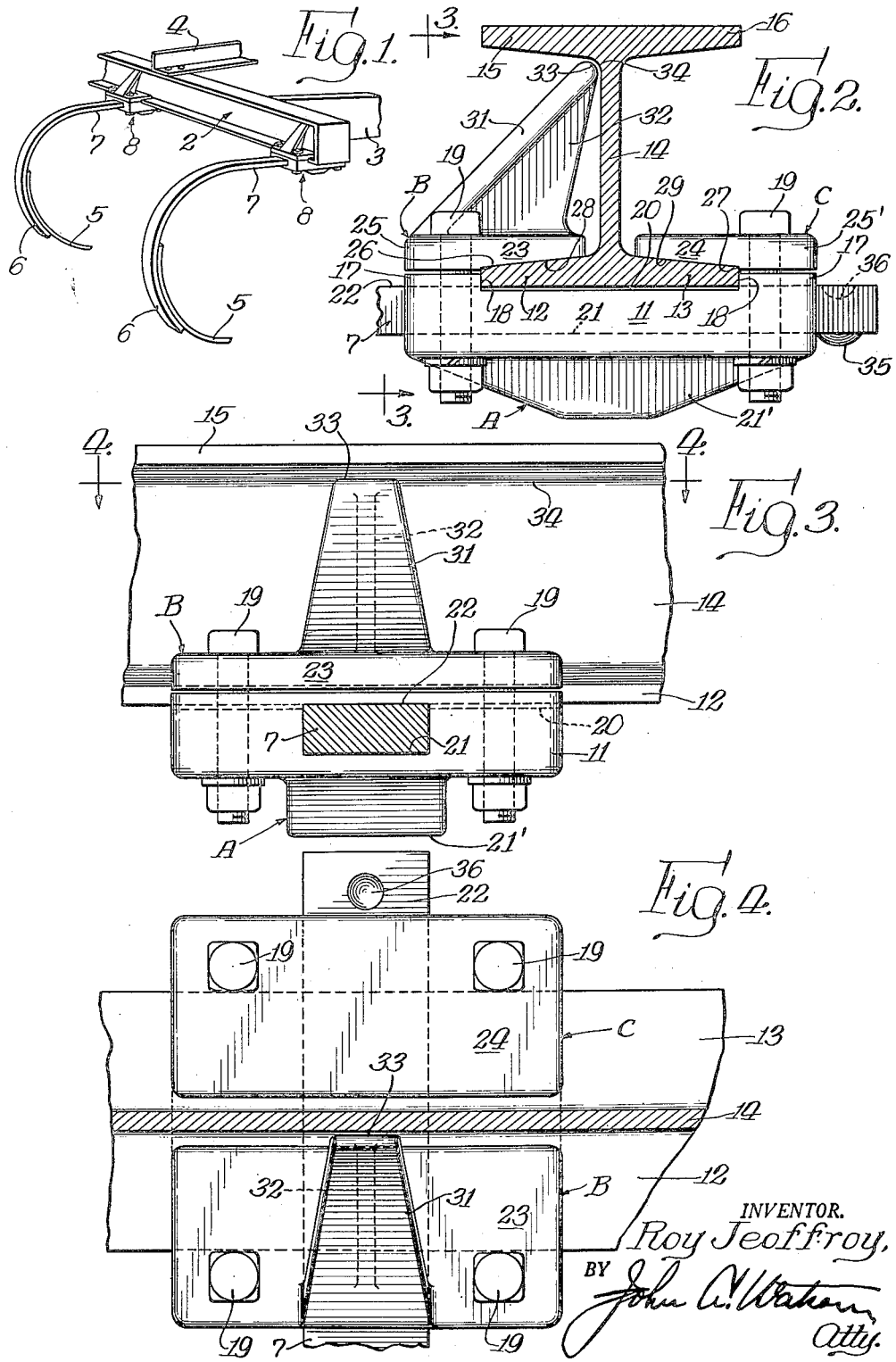

2,617,346

UNITED STATES PATENT OFFICE 2,617,346

CLAMP AND REINFORCING MEANS FOR STRUCTURAL MEMBERS

Roy Jeoffroy, Amarillo, Tex.

Application May 22, 1947, Serial No. 749,765

2 Claims. (Cl. 97—198.1)

The invention relates to devices of the nature of clamps or hangers by which one structural or load carrying member may be connected to another such structural member, to support the same or to be supported thereby, in such manner that leverage effects of one such member tending to twist or bend the other will be resisted. More particularly, and for the immediate purposes of an especially useful application of the invention and its principles, the invention may be said to pertain to a clamp by which an agricultural implement for plowing, harrowing or cultivating soil may be secured to H or I beams or to channels and similar structural framing of an agricultural machine without distorting, twisting or otherwise injuring the structural elements under the heavy impacts or loading and the tremendous leverage effects developed by the engagement of the implement with rock-hard soil, rocks, tree roots and other obstructions encountered by the implement as it is used in preparing the soil.

As indicated, the invention is very useful in connection with certain types of agricultural machines and implements. One such machine is illustrated and described in my prior Patent Number 2,082,163, dated June 1, 1937, and the invention will be disclosed herein in application to such machine wherein a plurality of relatively parallel H beams, I beams, channels or the like are connected together in spaced relation to one another by means of other structural members, the whole to be pulled or pushed by a tractor or other motive power. The transverse beams or channels or other such structural members, in the preferred constructions, are utilized as supports and anchors for ground working tools or implements such as plows, harrows, cultivators, rollers and other devices.

As shown in my prior patent the soil tilling or working portions of the tools are mounted (removably or otherwise) on shank members which have more or less horizontal portions by which they are secured to the machine frame and depending portions (generally curved or arcuate) to the lower parts of which the tools are secured. The horizontal portions are secured to the transverse beam members of the framing by clamps which may be adjusted lengthwise of the beams to give lateral adjustment of the tool positions while fore and aft adjustment of the tools is secured by foreshortening or lengthening the distance by which parts of the horizontal portions of the shanks project rearwardly and forwardly of the beam to which they are attached. Vertical adjustment to determine the depth to which the tools penetrate the soil is obtained by adjustment of a drawbar connection and by a lever and dog and a notched sector as revealed in said patent.

One of the greatest advantages of an agricultural implement or machine of the type described lies in its ready adaptability to and flexibility of adjustment to meet different soil characters and conditions and to various purposes or types of working. The adjustability of the clamps and, therefore, the tool shanks and tools both laterally or transversely of the machine and longitudinally (fore and aft) enables the user to provide a great variety of soil working patterns for the tools.

In the interests of economy, savings in weight and materials, the machine framing is composed of elements of such size and strength of materials as will meet all ordinary conditions of use with a reasonable factor of safety thereover. However it has been found that there are occasions as where the ground is unusually hard or where there are firm obstructions such as roots or rocks, the load imposed by engagement of a tool with such hard ground or obstruction may exert such force through the leverage of the tool shank as to twist or bend the beam or other structural element by which the tool is carried. Ordinarily the twisting or bending does not involve the entire beam or other element but is localized in or confined to the length portion thereof at and immediately adjacent to the place of attachment of the tool shank and its clamp and the effect thereof may range from simple distortion of the beam flange or flanges to bending of the beam web and flanges and other damage. In any such event the consequence may be that the tool mounted at such point is rendered partially or wholly inoperative for its intended purpose and the machine frame must be repaired or perhaps partially rebuilt. Damages of such character can be extremely serious to farmers, as will be appreciated.

Accordingly one of the primary objects of the invention is to provide a relatively simple and inexpensive reenforcement for the beam or other structural element which carries the tool so that distortion and damage to the structural element will be eliminated and so that the load will be distributed over a substantially greater portion of the element to the same end. It is to be observed in this connection, of course, that the invention is not confined, in its utility, to farm machinery but may be applied to other structures and structural purposes.

Another important object of the invention is to provide a clamp which not only may embody the reenforcing and load distributing feature above mentioned, but also features of simplicity or ease of construction and application, of ruggedness for long life, and of economy in weight and materials.

Many other objects as well as the advantages and uses of the invention will become apparent and understood after reading the following description and claims and after viewing the accompanying drawings in which:

Fig. 1 is a perspective view of a fragment of a machine such as that of my prior Patent 2,082,163, showing the clamp of the invention applied thereto;

Fig. 2 is an end or side elevational view of a clamp of the type shown in Fig. 1, applied to an H beam which is shown in section, the clamp carrying a part of the shank of a tool, and the scale of the figure being substantially greater than the scale of Fig. 1;

Fig. 3 is a rear elevational view of the clamp a of Fig. 2 as associated with the H beam and the tool shank, the view being taken along section line 3—3 of Fig. 2; and Fig. 4 is a top plan view of the clamp as associated with the H beam and the tool shank, the view being taken along the section line 4—4 of Fig. 3.

The fragment of the machine frame illustrated in Fig. 1 consists of the right rear end of a machine which includes a plurality of H or I beams arranged in parallel spaced relation and extending transversely of the direction in which the machine normally travels, a pair of side framing members of channel or box-section shape extending between and secured to each of the transverse beam members as by welding (the transverse beam members other than the rear one being welded at their ends to the sides of the respective side framing members and the rear transverse member being welded intermediate of its ends to the rear ends of the side frame members), and a plurality of angle irons which are bolted to and across the tops of the transverse beams and which converge together at the front of the machine where they are connected with one another and to an adjustable tractor hitch mechanism, as illustrated, described and claimed in the aforesaid patent. Wheels suitably mounted on rearwardly and downwardly inclined pivot arms at the sides at the front of the machine, and toothed sectors on the sides of the frame at the front with cooperative levers and dogs for adjusting the frame with respect to the wheel support arms and the pivot axes of such arms for adjustment of the frame height from the ground, complete the general features of the machine.

The rearmost transverse H beam is shown in Fig. 1 and there is designated 2 while a fragment of a side frame member is designated 3. One angle iron is shown at 4. Soil working tools, in this case plows 5 somewhat resembling cultivator teeth are riveted, bolted or otherwise secured to the depending curved ends 6 of heavy spring steel shanks the upper portions of which are tangents as shown at 7 adapted to be engaged by clamps generally designated 8 by which the tools are secured to the beams. The construction of the frame and clamps will be such that the clamps with the tools may be adjusted to a relatively infinite number of positions between the ends of the beams thereby to provide any soil working patterns desired and, as will more clearly appear hereinafter, the tangential portions 7 of the shanks of the tools may be moved fore and aft through the clamps to bring the soil working points of the tools closer to and farther from a position vertically beneath the beam to which they are attached. The ends of the rear beam may be covered by plates 9 (one only, shown) which, usually, will be welded to both the beam flanges and the web or stem connecting the flanges.

Each clamp 8 preferably is constructed as illustrated in Figs. 2, 3 and 4, and may be made as a steel casting or forging of three parts generally designated A, B and C, or in two parts by combining parts A and B or A and C, or, if the ends of the H beams are not closed by plates 9, parts A, B and C may be made as one integral piece. If made in one or two pieces the construction will employ set screws to effect clamping pressure between the tool shanks and the beams instead of clamping bolts as hereinafter described. The part A is so made as to have a base portion 11 of greater overall length than the perpendicular distance between the outer edges of the oppositely directed bottom flanges 12 and 13 of the H beam 2 which, of course, are integral with the web 14 and the top oppositely directed flanges 15, 16. Preferably the base portion has upwardly projecting front and rear margins 17 which provide shoulders 18 of a height equal to approximately half (or slightly more) of the thickness of flanges 12, 13 at their outer edges, thereby to provide strong abutments for the base part A against the flanges. Each of the base part margins is drilled or cored to provide bores for the reception of bolts 19 by which the clamp parts are secured together and to the tool shanks and beams.

Ordinarily the bottom and top or outer surfaces of any H or I beam utilized will be flat for which reason the top surface 20 of part A, except for a centrally disposed channel 21, will be conformingly flat and in one plane. The channel 21 is made to conform, in transverse section, fairly close to the cross-sectional shape and dimensions of the tangential portions 7 of the tool shanks except that the vertical dimension or depth of the channel or groove will be slightly less than the corresponding dimension of the tool shank thereby to cause the upper surface 22 of the shank to project somewhat above the level of the surface 20 so that firm frictional contact may be established between the surface 22 and the outer faces or surfaces of flanges 12, 13, when the shank is bottomed in the groove or channel 21 and the clamp is drawn tightly against the beam. The bottom portion of part A is thickened or off-set as indicated at 21' to compensate in strength for the channel or groove 21.

While the clamp parts may be formed as one, it is preferred that they be made separate as shown. Parts B and C have similar base portions 23 and 24 which include depending margins 25 and 25', respectively, complementary to the raised margins 17 of the part A, thereby providing shoulders 26 and 27, respectively, adapted to position these parts with respect to the flanges 12 and 13 of the beam. The shoulders 26 and 27 also serve to aid registration of bolt holes through these parts with the bolt holes of part A for the reception of bolts 19. In order that the upper parts B and C may be drawn toward the base part A to effect tight clamping engagement of the tool shank with the beam, the shoulders 26 and 27 will be of such depth as to provide a clearance at all times between the margins 17, 24 and 17, 25 as best shown in Figs. 2 and 3. Each of the base portions 23 and 24 of parts B and C has an inclined bottom surface 28 and 29, respectively, to conform to the upper surfaces of flanges 12 and 13.

The upper side surface of part C may be flat or otherwise shaped but the upper side of part B midway between the bolts 19, has an integral upwardly and inwardly inclined member 31 and an integral strengthening rib or gusset 32. Member 31 extends, in the preferred embodiment illustrated, from approximately at the outer edge of the part B to a place closely adjacent to the filleted juncture of flange 15 and web 14 of the beam. In order to allow for expansion and contraction of the clamp parts and beam and relative movements between the clamp parts during clamping and releasing and adjusting operations, it is desirable to provide a small clearance of from, say, $\frac{1}{16}$ inch to $\frac{3}{16}$ inch between the rounded upper ege 33 and the beam fillet indicated at 34. For purposes including economy, the member 31 may have tapered side edges as observable from Figs. 3 and 4.

Frictional contact between the outer surfaces of the flanges 12 and 13 of the beam and the upper surface 22 of the tool shank 7 enhanced by the pressure exerted by the clamp will be sufficient under ordinary circumstances to hold the shanks firmly, as adjusted, against the very substantial forces which tend to pull the shanks out of the channels or grooves. However, as a safety precaution, it may be desirable to provide a retainer or stop 35 on the free end of the shank as by "bumping" the metal sufficiently hard on one side to dimple it as at 36 thereby displacing metal from the opposite side to form projection or stop 35.

The tool shanks preferably are made of heavy steel spring stock and are heat treated and tempered as springs so that they may withstand the tremendous shocks and loads imposed upon them as the tools (plows and other soil working devices) are drawn through the ground. While their resilience and strength is such as to permit them to flex, such flexure should not be sufficient to permit the tools to avoid the work they are intended to do and, of course, their strength must be such as to prevent flexure beyond their elastic limits. When a shank is adjusted in a clamp to its outermost limit, as when the tool point is at its most remote point rearward (in the present embodiment) of the beam, leverage forces against the clamp and the beam through the tool shank will be at their maximum, as will be apparent. Such forces, serving much as a lever of the second class, become tremendous under some conditions of working and, with ordinary constructions may bend or break the beams to which the shanks are attached.

In some cases the beam web has buckled or bent under the stresses imposed thereby destroying the usefulness of the tool since it was either moved to a position where it no longer could till the soil or did so inefficiently. In other cases injury was done to the clamp or flanges of the beam with similar results. These and other difficulties and undesirable conditions are eliminated or obviated when a clamp of the character described is utilized. If, in the course of operation of the soil working machine, a tool should meet an obstruction such as a stone or root or merely a very hard and resistant soil, the force applied to the clamp and beam flanges, through the tool and its shank operating as a lever, will tend to bend the flanges or the web of the beam (clockwise viewing Fig. 2) but after a slight flexure of one or another of these parts and within the elastic limits of the material thereof, the upper rounded edge 33 of the member 31 will be brought into engagement with the corner fillet (or shoulder) 34 whereupon further flexure of the web 14 or movement of say, flange 12 toward flange 15 will be prevented and the forces applied will tend to be distributed over the entire beam length and to other parts of the machine frame. In this respect the member 31 of a clamp becomes a compression member or stay and, together with the beam web and flanges, creates, in effect, a box beam. But, by reason of the fact that the members 31 are located only at the places of greatest stress and weakness and are always so located regardless of the location of the tool shanks, the extra material strength and weight that would otherwise be required in a beam to accomplish the same end, is wholly avoided.

It will be appreciated that by suitable modification of the tool shanks, the tools could be connected to the beams to ride ahead of the beams with the effect of being pushed rather than pulled by the latter. In such arrangement the clamps would be retained in the positions illustrated so long as the shanks are attached to the bottom flanges of the beams, for the forces would still tend to rotate the beam in a clockwise direction viewing Fig. 2. However, the tool shanks could be attached transversely of the top flanges 15, 16 of the beam and used to "push" or "pull" the tools, in which case the clamps will be inverted with clamp parts B disposed so that the stay members 31 depend downwardly from flange 16 at the front sides of the beams toward the juncture of flange 13 with web 14.

The invention is capable of being applied to uses in the construction field as well as to agricultural machinery and since it is susceptible of various modifications as well as many types of use, I desire to be limited only by the invention spirit and the scope of the appended claims.

I claim:

1. In an agricultural device of the character described having a frame including a beam extending substantially transversely of the direction of normal movement of the device, a tool shank adapted to be secured to said beam with the axis of the shank extending transversely of the longitudinal axis of and beneath the beam, and a ground working tool carried by one end of said shank and depending therefrom for engagement with the earth, said beam including a web portion extending in a substantially vertical direction and having a pair of flanges extending in opposite directions at each of the top and bottom ends of said web, clamp means for securing said shank and beam rigidly together in said relationship comprising, a body having a pair of relatively flat surfaces, said surfaces being spaced apart longitudinally of the beam axis and lying in substantially the same plane and substantially contacting and substantially conforming to the bottom faces of the bottom pair of said flanges transversely of the longitudinal axis of the beam, said body having a groove extending between said surfaces and transversely of said beam axis for reception of said shank, a beam flange engaging part secured to said body at spaced places on opposite sides of said groove and shank at one side of said beam axis and overlying and engaging the top surface of one of said bottom pair of flanges, a second beam flange engaging part detachably secured to said body at spaced places on opposite sides of said groove and shank at the other side of said beam axis and overlying and engaging the top surface of the other of said bottom pair of flanges, a rigid brace member integral with one of said flange engaging parts and projecting upwardly therefrom at an acute angle toward and to a place closely adjacent to the juncture of one of said top pair of beam flanges with the beam web, and a rigid gusset extending between and connecting said brace member at its under side with the adjacent flange engaging part with which the brace member is integral, said gusset extending across the acute angle between the brace member and the upper portion of the said adjacent flange engaging part.

2. A combination clamp and reenforcing means for clamping a beam and a transversely extending member together, said beam including a vertical web having a pair of oppositely and outwardly directed flanges extending substantially normal to the plane of the web at the lower end thereof and an outwardly directed flange at the upper end of said web and substantially normal thereto, comprising a body having a pair of surfaces between its ends, said pair of surfaces extending in spaced relation to one another transversely of the beam axis and being adapted substantially to conform and substantially to contact and abut against the bottom surfaces of said pair of flanges transversely of said axis, each of said pair of surfaces terminating at each end in an upstanding shoulder, said body having a groove extending between said pair of surfaces and their said shoulders transversely of the beam axis, said groove being adapted for reception of the transversely extending member to be clamped to the beam, the depth of said groove between its bottom and top being less than the corresponding dimension of the transverse member to be received therein, a first flange-engaging means secured to both of said shoulders at one end of the body, said flange engaging means being extended across the top of said groove at such end and having a portion directed toward the other end of the body and spaced above said pair of surfaces with a spacing substantially equal to the thickness of a beam flange, a second flange-engaging means detachably secured to both of the shoulders at the opposite end of said body, said second flange engaging means having a portion extended across the top of said groove at such end and having a portion directed toward the first said portion and spaced above said pair of surfaces with a spacing substantially equal to the thickness of a beam flange, said body and said first and second said flange engaging means being together adapted to embrace said pair of beam flanges for clamping engagement therewith, a relatively rigid member integral with one of said flange engaging means and projecting upwardly therefrom at an acute angle into and toward the apex of the angle formed between said flange at the upper end of the web and the web, the upper terminus of said rigid member being disposed in close proximity to said angle apex, and a gusset member integrally connecting said rigid member and the flange engaging means with which the rigid member is integral.

ROY JEOFFROY.

REFERENCES CITED

The following references are of record in the file of this patent:

UNITED STATES PATENTS

| Number | Name | Date |
|---|---|---|
| 486,077 | Bordner | Nov. 15, 1892 |
| 921,572 | Walters | May 11, 1909 |
| 990,696 | Berrier | Apr. 25, 1911 |
| 1,042,674 | Helmbacher | Oct. 29, 1912 |
| 1,496,694 | Watson | June 3, 1924 |
| 2,029,249 | Noell et al. | Jan. 28, 1936 |
| 2,082,163 | Jeoffroy | June 1, 1937 |
| 2,464,225 | Graham | Mar. 15, 1949 |